United States Patent [19]

Monkelbaan et al.

[11] Patent Number: 5,707,563
[45] Date of Patent: *Jan. 13, 1998

[54] V-MODULE FRACTIONATION TRAY

[75] Inventors: Daniel R. Monkelbaan, Amherst; Michael R. Resetarits, Depew, both of N.Y.; Robert J. Miller, Houston, Tex.

[73] Assignee: UOP, Des Plaines, Ill.

[*] Notice: The term of this patent shall not extend beyond the expiration date of Pat. No. 5,554,329.

[21] Appl. No.: 711,763

[22] Filed: Sep. 5, 1996

Related U.S. Application Data

[63] Continuation-in-part of Ser. No. 403,154, Mar. 13, 1995, Pat. No. 5,554,329, which is a continuation-in-part of Ser. No. 167,297, Dec. 16, 1993, Pat. No. 5,407,605.

[51] Int. Cl.⁶ ................................................. B01F 3/04
[52] U.S. Cl. ........................................ 261/98; 261/113
[58] Field of Search ................................. 261/113, 98

[56] References Cited

U.S. PATENT DOCUMENTS

| | | | |
|---|---|---|---|
| 1,811,627 | 6/1931 | Heid . | |
| 2,591,343 | 4/1952 | Eld | 261/113 |
| 2,767,967 | 10/1956 | Hutchinson | 261/113 |
| 2,998,234 | 8/1961 | Haselden | 261/113 |
| 3,070,359 | 12/1962 | Canevari | 261/113 |
| 3,410,540 | 11/1968 | Bruckert | 261/113 |
| 3,533,609 | 10/1970 | Brandt et al. | 261/113 |
| 5,366,666 | 11/1994 | Chuang et al. | 261/97 |
| 5,407,605 | 4/1995 | Resetarits et al. | 261/113 |
| 5,523,062 | 6/1996 | Hearn et al. | 261/113 |

FOREIGN PATENT DOCUMENTS

| | | | |
|---|---|---|---|
| 233878 | 5/1924 | United Kingdom | 261/98 |

*Primary Examiner*—Tim R. Miles
*Attorney, Agent, or Firm*—Thomas K. McBride; John F. Spears, Jr.

[57] ABSTRACT

High capacity, low cost fractionation trays are formed from a number of adjacent triangular (v-shaped) downcomer modules. The trays are free of the horizontal perforated decking surface of conventional trays. The downcomer modules have perforations only in a bottom region for liquid passage and in an upper region for vapor passage, with the central portion of the two inclined downcomer sidewalls being imperforate. The difference in elevation between the bottom region and upper region is considerably larger than a ripple tray. A layer of packing material may be provided close to or adjacent the bottom surface of the tray.

1 Claim, 3 Drawing Sheets

V-MODULE FRACTIONATION TRAY

CROSS-REFERENCE TO RELATED APPLICATIONS

This application is a continuation-in-part of our prior application Ser. No. 08/403,154 filed Mar. 13, 1995, now U.S. Pat. No. 5,554,329 which was a continuation-in-part of application Ser. No. 08/167,297 filed 16 Dec. 1993 now U.S. Pat. No. 5,407,605. The teaching of our prior applications is incorporated herein.

FIELD OF THE INVENTION

The invention relates to gas-liquid contacting apparatus intended primarily for use as a fractionation tray in the separation of volatile chemical compounds in a fractional distillation column.

RELATED ART

U.S. Pat. No. 1,811,627 to J. B. Heid illustrates a fractionation column having an internal structure comprising plates 11 forming V-shaped elements. The vertically adjacent V-shaped elements form traversely aligned trays.

U.S. Pat. No. 3,410,540 issued to W. Bruckert illustrates a fractionation tray design comprising alternating decking sections and downcomers. This tray design employs a conventional rectangular cross-section downcomer. FIG. 11 shows the use of a contacting deck which has a saw-tooth shape rather than the normal flat deck.

U.K. Patent Specification 233,878 based application 11539/24 of May 9, 1924 by C. H. Boermann describes plate-like liquid distributors having vapor passageways. The distributors are shown as being at spaced intervals above beds of packing.

U.S. Pat. No. 2,591,343 issued to A. C. Eld describes a fractionation tray formed from a perforated sheet formed into adjacent V-shaped elements. These elements extend from the inlet to outlet downcomer indicating they were not intended to allow downward liquid flow through the tray. The entire surface of this sheet forming the vapor-liquid contacting area of the tray is uniformly perforated although perforations are now shown in the detailed drawing at the apex or valley of the corrugated sheet.

U.S. Pat. No. 2,998,234 issued to G. G. Haselden describes a vapor-liquid contacting device having a number of plates (trays) formed from V-shaped troughs. Descending liquid overflows into apertures in the two sides of each trough wall and runs as a thin film down the underside of the trough wall before dripping into the lower tray. Gas apparently flows through the same apertures. This apparatus may include fine holes at or near the bottom of the troughs to allow the apparatus to be drained, presumably when it is being shut down.

U.S. Pat. No. 3,533,609 issued to H. Brandt et al illustrates a fractionation tray design comprising plates or strips which are folded in zig-zag fashion or are corrugated to form drainage pockets from which liquid flows into short channels which distribute the liquid. Stamped portions extend above and below the plane of the plate and undefined openings are left for upward vapor passage.

U.S. Pat. No. 2,767,967 to M. H. Hutchinson illustrates a type of dual-flow tray referred to in the art as a ripple-tray. In this tray the rising vapor and descending liquid both pass through the same openings in the surface of the tray deck. The deck may have many topologies ranging from the sinosoidal curve of FIGS. 3 and 4 to the more planar shape of FIGS. 5 and 6 (see column 3, line 11). The variations in the elevation allow for less liquid depth on higher portions of tray which in turn allows for upward vapor passage, while liquid descends through the tray at points which allow for a greater liquid depth. The trays of this reference differ from the subject invention in that it has a much smaller depth between the highest and lowest points and a uniform perforation pattern (see column 6, lines 10–20).

U.S. Pat. No. 5,366,666 issued to K. T. Chuang et al. illustrates a Multiple Downcomer fractionation tray in which a bed of packing material located below the tray is wetted by liquid exiting the downcomers.

BRIEF SUMMARY OF THE INVENTION

The subject invention is a high capacity fractionation tray having a deck made entirely of adjoining downcomer modules having a triangular cross-section. This provides a high capacity gas-liquid contacting apparatus possessing good efficiency. The triangular cross-section downcomer modules extend downward only a portion of the distance to the next tray, with liquid exiting through perforations in the bottom region of the downcomer module sidewalls and vapor passing through the upper regions of the downcomer modules sidewalls. The central region of the sidewall is imperforate.

One embodiment of the invention may be characterized as a fractionation tray adapted for being mounted in a horizontal plane in a vertical fractionation column, said tray having upper and lower surfaces and comprising a perforated tray deck formed entirely from a plurality of adjacent triangular downcomer modules and substantially free of horizontal planar imperforate or perforate areas; with each downcomer module comprising a pair of planar sidewalls which are inclined at substantially equal angles from the plane of the tray and joined together to form sealed top and bottom regions of the downcomer module separated by an imperforate central region; and, with perforations being located in the downcomer module sidewalls in the top and bottom regions of the downcomer modules.

In some embodiments of the present invention a bed of structured or random (dumped) packing material is suspended below the tray, with the packing being wetted by liquid exiting the downcomers.

DETAILED DESCRIPTION AND PREFERRED EMBODIMENTS

Figure 1:
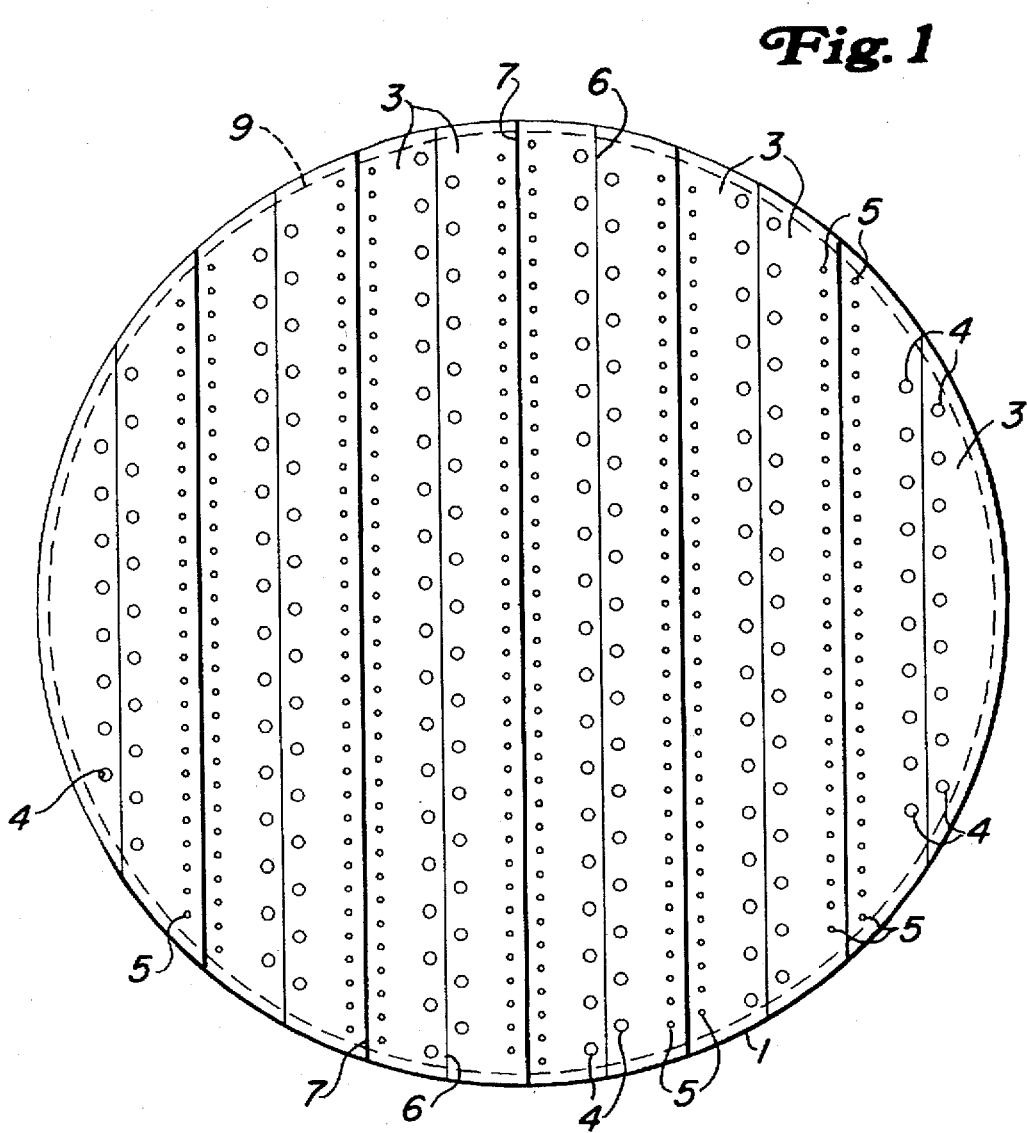
FIG. 1 is an overhead view of one embodiment of the subject gas-liquid contacting tray 2 employed as a part of a fractionation column.

Fractionation trays find utility in the separation of a wide variety of chemicals including hydrocarbons, alcohols, ethers and other compounds in petroleum refineries, petrochemical units and chemical manufacturing plants. As with any useful industrial equipment, there are constant demands to improve the performance and lower the cost of the equipment. Several different types of trays, each having its own advantages and disadvantages have been developed. A simple pictorial depiction of the different types of trays; e.g. sieve trays, dual flow, trays and Turbogrid trays is provided at pages 3–4 of *Distillation tray fundamentals*, by M. J. Lockett published by Cambridge University Press, 1986.

While performance related characteristics such as efficiency and capacity are very important tray parameters, the cost of a tray is also very important. One of the biggest disadvantages of some trays is the cost of manufacturing the tray, which is greatly influenced by the complexity of its design. The greater the number of pieces required to assemble a tray, the more it costs to fabricate and then assemble the pieces into the finished tray. Particular assembly techniques such as welding also increase the cost of manufacturing a tray. Therefore a very simple tray, such as a dual flow tray, has the advantage of low manufacturing costs.

A number of different types of trays have a simple design comprising large planar deck areas which should help reduce the cost of the tray. These include sieve, dual flow and ripple trays. For instance, a dual flow tray comprises a flat deck with uniform perforations sized large enough to allow both liquid to descend and vapor to rise through the same openings. Therefore dual flow trays do not require downcomers or other accessories and are low in cost. However, dual flow trays tend not to work very well at tray diameters larger than four feet. Ripple trays are similar to dual flow trays but have small variations in the height of the tray deck as shown in previously cited U.S. Pat. No. 2,767,967. These variations provide depressions which allow liquid to collect and drain to the next tray much like a downcomer. Dual flow and ripple trays also share the disadvantage of being very sensitive to departures from the optimum (design) fluid flow rates. Cross-flow trays have large planar areas and use downcomers to achieve higher tray efficiencies. They still have the disadvantage of being more costly to fabricate and install.

It is an objective of this invention to provide a low cost, high-capacity fractionation tray. It is another objective of the invention to provide increased separation efficiency in high capacity fractionation trays. It is a further objective to provide a tray having minimal vertical height and suitable for use together with interspaced cylindrical beds of packing.

The subject trays have no large flat tray deck areas. The entire surface of the tray, with the possible exception of small areas near the edge of the tray, is formed from triangular downcomer "modules" and is thus free of the traditional flat decking material.

The subject tray has no significant horizontal surface on the vapor liquid contacting area of the tray. The tray is composed of a number of adjacent V-shaped structures which are attached to one another. Each of the inclined sidewalls is attached to another sidewall to form a fluid-tight seal at both the upper and lower edges of the sidewall, which are horizontal when the tray is in use. This fluid-tight seal is broken only by desired perforations for downward liquid flow. Each sidewall preferably has at least one upper and one lower row of openings separated by a central imperforate region. The upper row allows vapor to pass upward through the tray. The lower openings function as the openings in the bottom of a downcomer through which liquid drains downward to the next tray.

The otherwise imperforate sidewalls have openings for liquid flow from the tray provided only in selected regions of the sidewall near the bottom of these depressed areas. In one embodiment of the invention individual perforations are present only in the upper region of each sidewall and a single long gap between the bottom edge of the sidewalls is provided to allow for the downward flow of liquid. Likewise perforations for upward vapor passage are provided in only the upper regions of the downcomer modules.

Therefore the subject trays differ from some prior art apparatus in that perforations are not uniformly spread across the flat pieces forming the deck. Perforations are only present near the top and bottom of the sidewalls. The subject trays also differ from some other trays in that they can have a high percentage of open area—the area provided by perforations in the tray deck—on the order of about 35–40%, like dual flow trays. This open area can range from 30–45%. In contrast a normal cross-flow sieve tray will usually have an open area less than about 20%. Another characteristic of the subject invention is the use of relatively large perforations on the order of 0.95–1.3 cm (⅜–½ inch) diameter in the case of round openings at the bottom of the downcomer as compared to the typical sieve tray opening of about 0.5 cm (³⁄₁₆ inch) diameter. Another embodiment of the invention is distinguished by the bottom opening being in the form of one or more slots between or along the bottom edges of the sidewalls.

The subject apparatus is used in fractionation columns. In these columns there is a general upward flow of vapor and a countercurrent generally downward flow of liquid. The composition of the vapor and liquid changes as they flow through the column normally to perform a desired separation between more and less volatile components of a feed stream. Vapor rises upward through the trays by way of perforations in the upper region or peak of the downcomer structures. Liquid descends through the column and is collected on each tray in the valley of the downcomer, with the liquid exiting via the perforations in the lower portion of the downcomer structure.

One characteristic of the subject tray is that it does not have a "receiving pan". A receiving pan is the imperforate horizontal area of a tray below a downcomer and upon which the liquid descending through the downcomer impacts before passing horizontally onto the active decking of the tray. Often the receiving pan is separated from the active decking area of the tray by an inlet weir. On conventional trays receiving pans are normally located directly below the downcomer leading from the next above fractionation tray. The surface area of the subject fractionation tray is formed entirely of the V-shaped downcomer modules and divided into depressed areas functioning as downcomer means and elevated vapor passage areas or regions. There are no large imperforate areas allocated to receiving descending liquid from the tray located immediately above.

Another distinguishing feature of the subject fractionation trays is the use of liquid sealable outlet means in the bottom region of the downcomer module to retard vapor passage. The term liquid sealable is intended to indicate that when in use sufficient retained liquid covering or passing through the outlet(s) to prevent the upward passage of vapor, during normal operation, through the outlets. As compared to drain holes for use in decommissioning the tower, these outlets are sized to accommodate and remove the entire downward liquid flow in the column during its use. This liquid sealable outlet means is located well above the deck of the tray located immediately below. The descending liquid is collected in the lower portion of the downcomer module and spills forth upon the next lower tray through openings in the side of the downcomer module sidewalls or through the other openings provided for this purpose.

FIG. 1 shows the view seen looking toward the upper surface of the circular tray 2. As the trays are the same on top and bottom, this would also be the view from below the tray when it is mounted in its normal horizontal position in a fractionation column or other vapor-liquid contacting device. Each tray 2 is formed entirely from adjacent downcomer modules having a triangular cross-section as viewed from the end. The term downcomer modules is used herein to refer to these V-shaped structures to acknowledge these structures function differently than a conventional downcomer. The subject downcomer modules function as both a traditional downcomer and as the traditional deck area of the tray. This difference in function is directly linked to the structural differences between the subject tray and the prior art.

FIG. 1 illustrates the distribution of the two types of openings in this tray embodiment which are provided to allow the fluid flows necessary for fractional distillation. Larger liquid sealable openings 4 intended for the downward passage of liquid are provided in the "valley" of each downcomer module. Both types of openings can be in one or more rows per panel or laid out in number of suitable patterns along the length of the sidewall.

Figure 2:
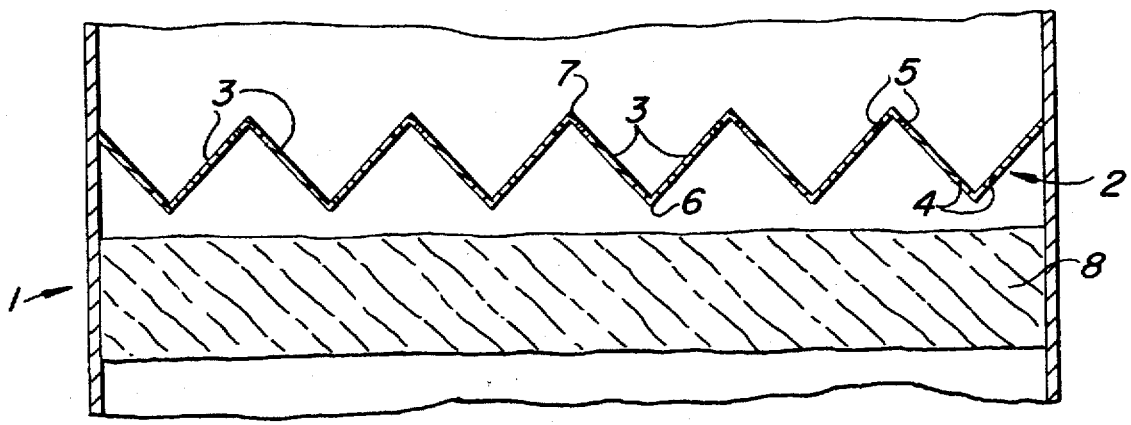
FIG. 2 is a side view of a tray similar to that employed in the column shown in FIG. 1.

FIG. 2 is a side view of the tray of FIG. 1 showing the repeating triangular or V-shaped structure which characterizes the invention. This structure can be formed by a forming operation on a large piece of flat metal but is preferably formed by assembling a series of individual modules or panels forming one or more of the V's. These individual V's or downcomer modules can then be fastened together with bolts or by welding to form the tray. Each downcomer module is considered as comprising at least two inclined sidewalls 3 which come together to form a valley.

FIG. 2 also illustrates the use of an optional bed 8 of packing located in the cylindrical open volume of the column beneath the tray deck. That is, the tray may be modified by the addition of packing below the downcomers if desired. The addition of a properly designed and wetted bed of packing below a tray has been found to provide a system having an increased overall efficiency compared to using just the tray. The perforations in the lower region of the downcomers are in this instance employed as a means to spread liquid onto the packing bed(s). Each bed preferably has a thickness, measured top to bottom, greater than the depth of a downcomer, but less than the distance between trays. The beds preferably fill 20–70% of the volume between the lowermost point of a downcomer module and the top point of the next lower tray. If the subject apparatus is employed for catalytic distillation, the packing may include catalyst.

Figure 3:
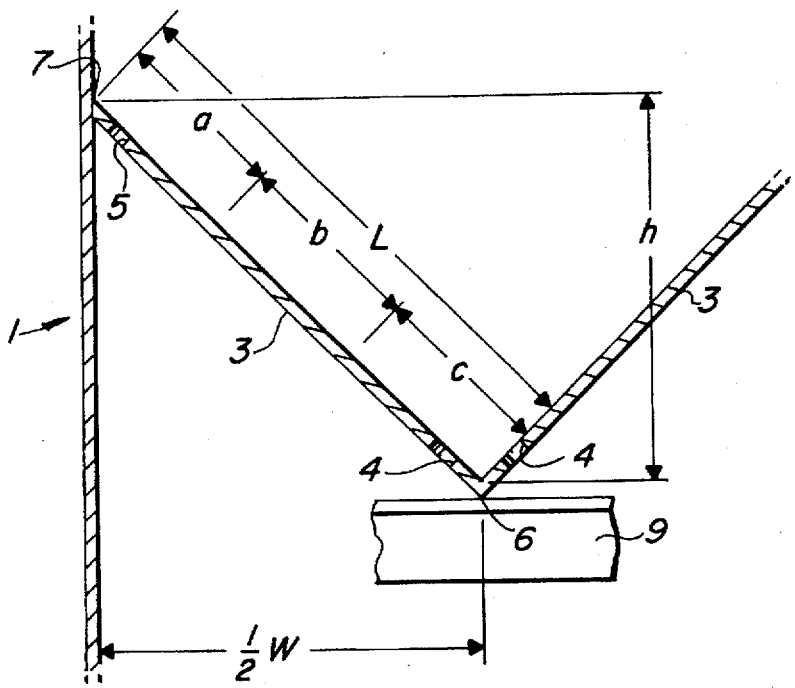
FIG. 3 is an enlarged view of a portion of a tray labeled for description of the relative dimensions of elements of the tray.

FIG. 3 is an enlarged view of a portion of a downcomer module located adjacent to the inner surface of the sidewall of the outer vessel 1. Like FIG. 2 this side view shows the V-shape of a downcomer module. The sidewall or panels of the downcomer modules are divided into an upper region 'a', a lower region 'c' and an imperforate central or middle region 'b'. The downcomer module valley has a height 'h' and a width 'W'. The imperforate region 'b' is equal to 40 to 70 percent of the width 'L' of the sidewalls. The upper region may equal 20 to 50 percent of the distance 'L'. These three regions need not be symmetrically spaced or sized.

The height 'h' of the downcomer module is from 40 to 100 percent of the width 'W' of the downcomer module. The distance 'L' between the extremities of the upper and lower regions may range between about 50 to 200 percent of the horizontal distance 'W' between the repeating regions. The distance L is preferably about equal to the distance 'W' The distance 'b' is preferably greater than about 2 inches (5.0 cm) and may exceed 3 inches (7.6 cm). The distance 'h' is normally greater than about 5 inches (12.7 cm). The depth of the valleys on the subject tray is therefore much greater than those in the prior art ripple trays, which are reported to have a maximum vertical depth of less than 1 inch (2.5 cm). The distance 'L' may range broadly from about 3.0 to about 12.0 inches (8–30 cm). A preferred range is from about 3 to about 7 inches (7.6–18 cm), with 4 inches (10 cm) being a nominal value. FIG. 3 also shows a portion of the support ring 9 attached to the inner surface of the outer vessel. The bottom corner 6 of an end of the downcomer module rests upon this support ring.

FIG. 3 shows small perforations 5 at the top of the panel 3 to allow vapor passage upward through the upper region 'a'. The vapor perforations are scattered about this upper region in a pattern of rows or a triangular grid. A larger opening 4 in the lower region 'C' allows liquid to drain out of the downcomer module. The perforations in the tray deck are concentrated into these two regions rather than being uniformly spread across the surface of the tray as in dual flow or ripple trays. In order to obtain effective fractional distillation the vapor rising through the openings 5 must contact liquid or froth retained on the tray and being continuously supplemented with liquid from above.

The downcomer modules on a particular tray may be oriented perpendicular to those on the vertically adjacent trays or they may be rotated in other directions. A perpendicular, or at least partially rotated arrangement, is considered optimal but may be departed from if desired. That is, the downcomer channels on vertically adjacent trays may run in the same direction as shown in FIG. 4, or may be arranged traversely.

The perforations in the downcomer sidewalls are preferably arranged in rows running along the major axis of the downcomer module. It is preferred that the holes are located in the sidewalls rather than along the bottom of the V-shaped structure. This helps impart horizontal velocity to the egressing liquid causing it to travel away from the bottom of the structure. This is beneficial in spreading the liquid over any packing which is located below the tray hence ensuring more uniform wetting of the packing and is also useful in spreading the liquid over the tray below.

Figure 4:
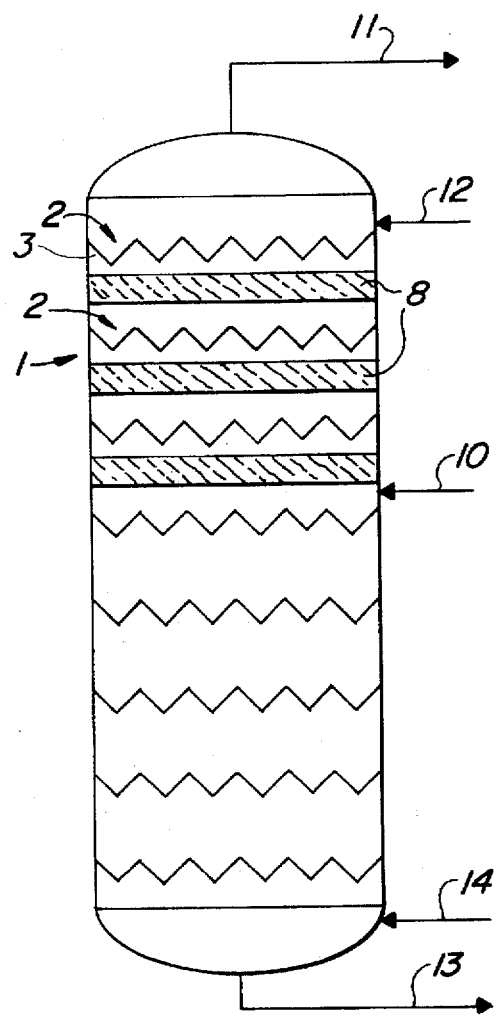
FIG. 4 is a sideview of a fractionation column 1 showing vertically spaced trays 2 and optional packing beds 8 in an upper portion of the tray.

FIG. 4 is a side view illustrating the use of the subject trays in a fractionation column. The vertical generally cylindrical outer vessel 1 contains a number of vertically spaced apart trays. A commercial column will contain a plurality, e.g., 10–150 of these fractionation trays located at uniform intervals. The vertical spacing between the trays, preferably equal to 2–5 times the height "h" of the downcomer modules, is clearly shown in this Figure. This is an appropriate point to set out a fundamental difference between fractionation trays and packing distributors: trays "froth" whereas distributors "rain". That is, fractionation trays form a froth on their upper surface to promote mass transfer between the vapor and liquid phases. Distributors collect and separate the phases before allowing the liquid to fall in a desired pattern.

A multicomponent feed stream from line 10 is separated within the column into an overhead vapor stream comprising a more volatile chemical compound removed via line 11 and bottoms liquid stream removed via line 13 and comprising a less volatile compound. The compounds entering the column are separated therein by fractional distillation, with the more volatile compound(s) being carried upward through the column by an ascending vapor stream. The vapor stream passes through the trays and eventually exits the column as an overhead vapor. A portion of the condensate derived from the overhead vapor is returned as liquid-phase reflux via line 12. The less volatile component(s) of the feed are concentrated into the descending liquid-phase stream and eventually removed from the bottom of the column. Heat and vapor are supplied to the bottom of the column by a reboiler not shown as by vaporizing a portion of the bottoms liquid and returning it to the column via line 14. In this embodiment of the invention the trays above the feedpoint are outfitted with the optional beds of packing 8 located between trays.

Figure 5:
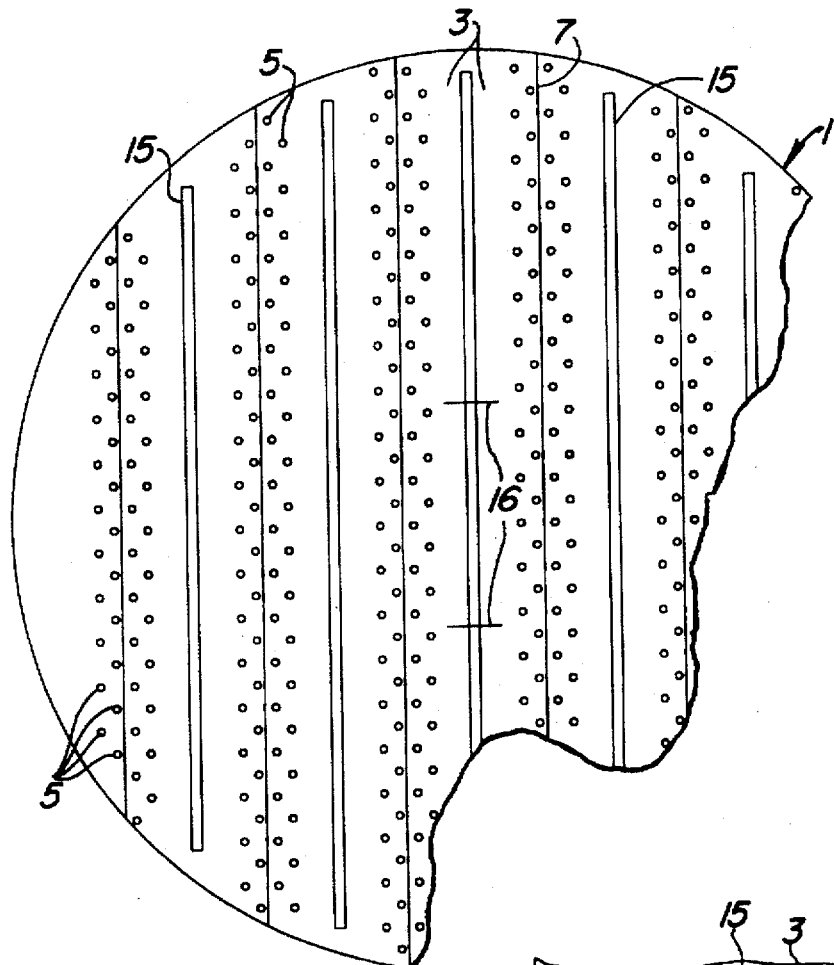
FIG. 5 is an overhead view of a different embodiment of the invention characterized by the liquid outlet being in the form of a single narrow slot 15 extending along the bottom of the V-shaped modules.

FIG. 5 illustrates possible structural variations in the trays. In this embodiment of the invention the liquid sealable outlet means at the bottom of the downcomer module is in the form of a substantially continuous slit 15 or gap between the two opposing panels sidewalls 3. Reinforcing plates 16 bridging across the slit 15 are shown on the central downcomer. These plates extend between the sidewalls 3 to increase the strength and rigidity of the tray. This slit eliminates the need for the openings 4 of other embodiments. The slit is believed to have some operational benefits but may not distribute the descending liquid as well as the more widely spread apart circular openings. This is of more concern when the trays are used in conjunction with the optional beds of packing as the performance of the packing is very dependent on uniform liquid distribution and packing "wetting". Those skilled in the art will recognize that the structure of this elongated opening can be varied in many ways. For instance, a somewhat discontinuous gap can be provided by forming the gap by shortening alternating portions of the opposing panels in an interlocking pattern.

Figure 6:
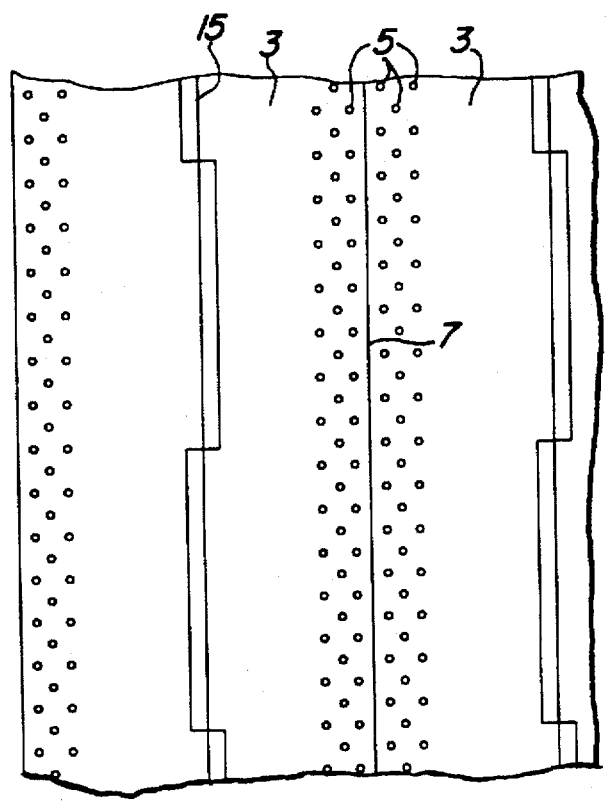
FIG. 6 is a view of portions of three sidewall panels 3 of yet another embodiment of the invention having the liquid outlet slit 15 formed by interlocking notches at the bottom of the sidewalls.

FIG. 6 illustrates this interlocking gap 15 formed by the downward projecting tongues on the bottom of the downcomer sidewalls. This will tend to distribute liquid horizontally as it flows out of the outlet means. This Figure only illustrates a portion of three panels or sidewalls 3. The arrangement of the small vapor passageways 5 near the apex 7 of the downcomer module differs from that in the other embodiments of the tray in that the vapor passageways are arranged in three rows per panel. These perforations can be arranged in a variety of patterns and have different shapes or sizes. For instance, the lowest row can be larger in diameter than the upper row(s). The sidewalls still have the substantially imperforate central region.

The perforations in the lower region of the downcomer sidewalls are preferably circular but can have other shapes including horizontal or diagonal slots, stars, squares, ovals, etc. Slots can extend across the bottom of the downcomer module from one sidewall to the other or can be located only in one sidewall. The perforations in a module may have more than one shape. The use of a smaller number of larger perforations is preferred although a large number of small perforations can be used. Larger perforations are more resistant to fouling or plugging. The perforations should be located more or less uniformly along the length of both sidewalls in one or more rows. Circular openings of about 0.5–2.5 centimeters diameter are suitable with openings greater than 1.2 cm being preferred. A highly preferred size is about 1.9 cm. Another important factor in the placement of the lower perforations is the provision of an adequate distance between the uppermost part of the downcomer module and the perforations to allow the froth to separate into clear liquid and vapor. This is important to good tray efficiency and performance in general. This distance should provide sufficient liquid head to seal the liquid outlets and prevent the upward passage of vapor through the lower sidewall downcomer perforations. This desirable placement of the liquid perforations can be characterized as being in the lower third of the downcomer sidewall. The presence of these openings eliminates the need for drain holes if any of the openings are located at the very bottom of the downcomer module.

The open area provided by perforations 5 in the upper region of the downcomers for vapor passage may be as high as 30–45% of the tray surface, as compared to a lower area of up to 20% normally used on ripple trays. The open area provided by the vapor perforations 5 may range from one-half to twice the open area of the liquid perforations 4. Preferably the vapor perforations provide a larger open area equal to at least 133% of that provided by the liquid openings. These vapor openings can range in size from about 0.3 to 1.9 cm in diameter, with a preferred size being about 0.5 cm. The vapor openings 4 are also preferably distributed between both panels.

One embodiment of the invention may be characterized as a gas-liquid contacting apparatus consisting essentially of (that is, not having any other significant deck structure materially affecting performance) a sawtooth cross-section deck formed from a plurality of parallel triangular structures dividing the deck into uniformly spaced apart relatively high, low and intermediate regions, with the intermediate regions being substantially imperforate and the upper and lower regions each having a plurality of perforations for fluid passage.

Another embodiment of the invention may be characterized as a vapor-liquid contacting tray for use in vertically oriented columns in which a rising vapor stream passes through a plurality of vertically spaced apart trays which extend across the internal volume of the column, the vapor-liquid contacting tray being characterized by the absence of downcomer conduits extending from the tray and by the presence of a substantially circular deck area formed substantially entirely from aligned inclined panels having parallel upper, middle and lower regions, with the upper and lower regions being perforated and the middle regions being substantially imperforate, and with adjacent panels having different inclinations which caused the adjacent panels to intercept each other in a sawtooth pattern.

The subject apparatus can be used in a variety of gas-liquid contacting operations including absorption, gas treating for impurity removal and other processes besides fractional distillation. In each of these processes, gas rises upward through the trays and the retained froth while liquid trickles downwardly through the contacting structure in a well-distributed manner and emerges therefrom as droplets which fall onto the next lower tray or packing.

It may be noted from the Figures that there is no packing material on the upper surface of the trays or in the volume immediately above the trays. This allows conventional frothing and unobstructed liquid flow to occur.

The optional packing beds may be suspended by a porous woven wire screen. The screen itself may be held in place in a number of ways. The screen may rest on a grid or a plurality of support bars not shown which crisscross the internal volume of the column in a plane parallel to the tray. The screen or the individual packing elements may alternatively be suspended from the tray above. These mechanical details can be varied to suit individual situations and are not deemed to be a limitation on the inventive concept.

The optional packing beds may contain random packings; e.g., rings, spheres, saddles, structured or ordered bed packings; e.g., corrugated, rolled, screens or plates. Examples of random and structured packings are provided in U.S. Pat. Nos. 5,200,119 and 5,132,056.

The upper surface of the packed bed of FIG. 2 is not located adjacent (in contact with) the bottom Surface of the tray. The top of the packing may be from 1 to 8 centimeters below the lowest point of the tray, with a gap of 2–3 centimeters being preferred. With a dumped packing the upper surface of the bed will be somewhat irregular. If desired, the packing may be in contact with a portion of the sidewalls of the downcomer modules and thus fill some of the normally empty volume located between adjacent downcomer modules. The packing material bed may be in the form of preassembled units which are installed under pre-existing trays, fabricated in situ under trays or made as an integral part of the overall tray structure. Structured packing may be added to the tray as bundles or subassemblies which together form the packing bed. A dumped packing may be added to the bed through openings in the wall of the outer vessel or through openings in the tray deck above. This unstructured packing may also be preloaded in porous retaining baskets which are then installed under the tray.

The amount of packing used with any one tray is preferably equal in volume to less than 50 percent of the open volume of the column between the upper and lower trays of the pertinent tray pair enclosing the packing. The packing bed of the subject invention preferably extends downward to within 8 centimeters of the intended upper surface of the froth on the next lower tray. The bottom of the packing is therefore well above the top of the next tray. A minimum vertical bed thickness of 10 cm is desired, with beds up to 150 cm thick being contemplated.

The apparatus according to the present invention can be used in the form of a new apparatus or as a modification to an existing apparatus. That is, an existing trayed column may be modified to employ the subject invention. One embodiment of the subject apparatus may accordingly be characterized as a fractionation tray adapted for being mounted in a horizontal plane in a vertical fractionation column, said tray having upper and lower surfaces and comprising a perforated tray deck formed entirely from a plurality of adjacent triangular downcomer modules and substantially free of horizontal planar imperforate or perforate areas; with each downcomer module comprising a pair of planar sidewalls which are inclined at substantially equal angles from the plane of the tray and joined together to form sealed top and bottom regions of the downcomer module separated by an imperforate central region with a row of perforations being located in the top portion of each of the downcomer module sidewalls, and with a liquid sealable outlet means for liquid removal at the full operating rate of the column being located in the bottom region of the downcomer module, and with the perforations in the upper region of each downcomer module sidewall having a greater total area than the larger perforations in the lower region of the corresponding downcomer module sidewall forming the liquid sealable outlet means.

What is claimed:

1. A fractionation tray adapted for being mounted in a horizontal plane in a vertical fractionation column, said tray having upper and lower surfaces and comprising a perforated tray deck formed substantially entirely from a plurality of adjacent triangular downcomer modules; with each downcomer module comprising a pair of planar sidewalls which are inclined at substantially equal angles from the plane of the tray and joined together to form sealed top and bottom regions of the downcomer module separated by an imperforate central region with perforations for passage of the entire upward vapor flow in the column being located in the top region of the downcomer modules and with a liquid sealable outlet means sized for the entire onstream downward liquid flow in the column during use being located in the bottom region of the downcomer module.

* * * * *